Nov. 8, 1960

P. L. BILLARD ET AL 2,959,099

OPTICAL REPRODUCING SYSTEM

Filed April 16, 1956

INVENTORS
PAUL LOUIS BILLARD
MARC OLIFFSON
BY
AGENT

Nov. 8, 1960    P. L. BILLARD ET AL    2,959,099
OPTICAL REPRODUCING SYSTEM
Filed April 16, 1956    2 Sheets-Sheet 2

INVENTORS
Paul Louis Billard
Marc Oliffson
BY
AGENT

United States Patent Office 2,959,099
Patented Nov. 8, 1960

2,959,099

OPTICAL REPRODUCING SYSTEM

Paul Louis Billard, Paris, and Marc Oliffson, Herblay, France, assignors, by mesne assignments, to North American Philips Company, Inc., New York, N.Y., a corporation of Delaware Filed Apr. 16, 1956, Ser. No. 578,519

Claims priority, application France Apr. 15, 1955

2 Claims. (Cl. 88—57)

The present invention relates to optical reproducing systems of the kind comprising a lens objective, a field lens system, a relay lens system and an image surface, this system being adjustable to different object distances by displacing the objective.

It is known that the light intensity of an optical reproducing system varies in the first place with the aperture ratio of the objective. In order to keep the light intensity of the exposure within reasonable limits, which is particularly important with film recording and colour-television recording, a large relative aperture ratio will always be aimed at. However, such large aperture ratios are not obtainable in practice, if the objective has a large focal distance or a particularly large image angle. Therefore, if it is necessary to proceed from the recording of a scene to the recording of a detail thereof, to which end a different objective is frequently used, the aperture ratio must be readjusted, which results in a reduction in light intensity for the film or for the photosensitive surface of the electronic camera tube.

The latter drawback is particularly unfavourable for television recording, in which the reduction in light intensity can be compensated only by an increased amplification of the video signal.

It is known to use a so-called relay lens in the light path between the objective and the film or the photosensitive surface of the camera tube.

It is furthermore known to use a field lens system to cause the optimum quantity of light of the reproducing beam to strike the image surface.

The present invention has for its object to improve optical reproducing systems of the aforesaid kind. It has particularly for its object to provide a construction which permits of obtaining reproduction, the quality of which varies less with the distance of the specimen.

The optical reproducing system of the aforesaid kind has, in accordance with the invention, a field lens system, comprising two parts, of which the first and the second are remote by their respective focal distances from the outlet pupil of the objective and from the inlet pupil of the relay lens system respectively; in this system the first part of the field lens system together with the objective is displaceable in the direction of the optical axis of the system relative to the second part of the field lens system and the relay lens system. The objective and the first part of the field lens system will, as a rule, be arranged so as to be movable and the second part of this system and the relay lens system will be stationary.

In a preferred embodiment of an optical system according to the invention the magnification of the relay lens system is lower than 1.

When using the latter embodiment it is possible to obtain on the image surface images with a light intensity which does not vary with the objective employed, it being assumed that the angular aperture of the objective on the image side is, on a first approximation, at least equal to the angular aperture of the relay lens system on the side of the object. The aperture ratio of the optical system obtained in this manner is substantially equal to the quotient of the relative aperture ratio of the objective with the smallest aperture ratio of the optical reproducing system and the magnification of the relay lens system.

The invention will be described more fully with reference to the accompanying drawing.

Figure 2:
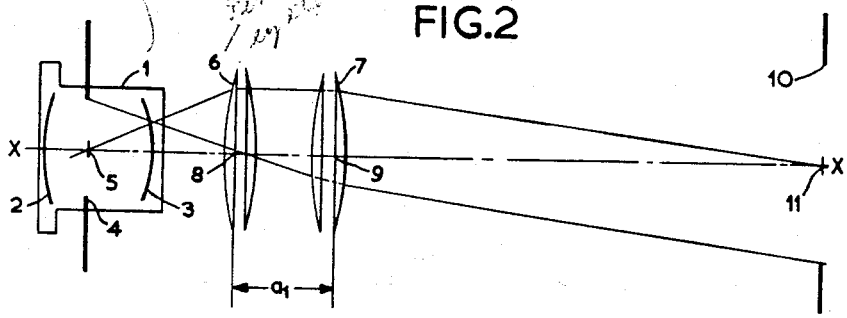
Fig. 2 shows the same embodiment, in which the objective is adjusted to a finite distance.
Figure 3:
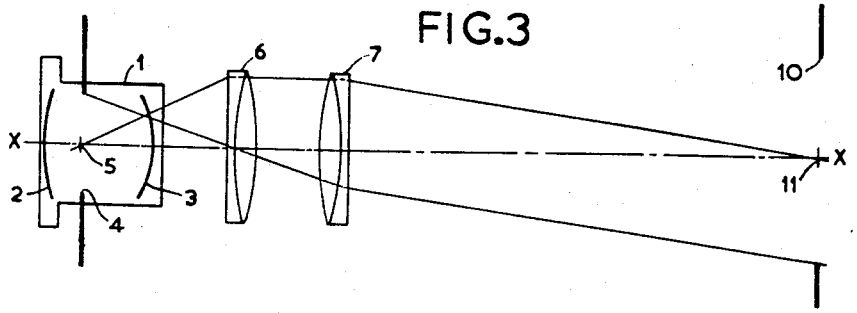

Fig. 3 corresponds to the embodiment shown in Fig. 2, in which the field lens system comprises two achromatic doublets.

Figure 4:
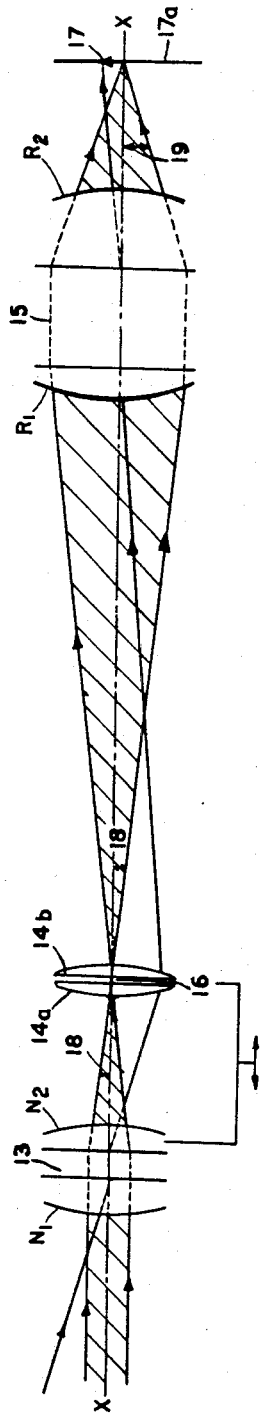

Fig. 4 is a diagrammatical view of the complete optical system according to the invention.

Figure 5:
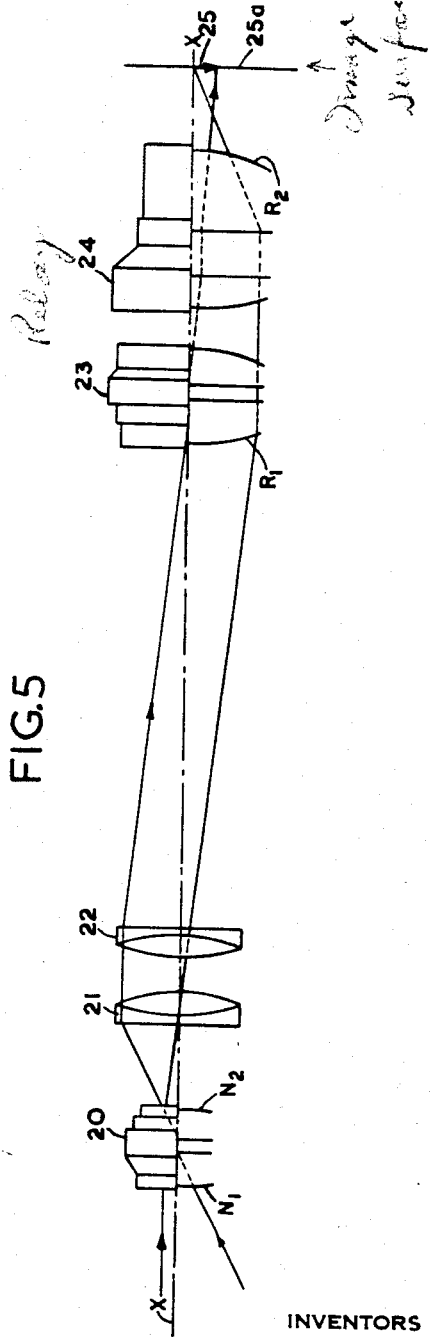

Fig. 5 is partly a front view, partly a sectional view of the optical system shown in Fig. 4 in a practical form.

Figure 1:
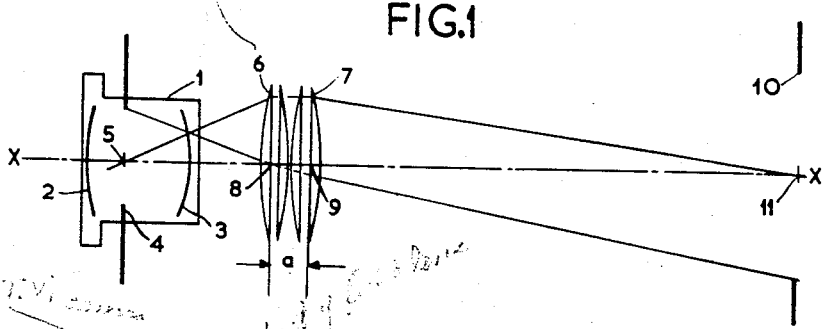
Fig. 1 shows one embodiment of part of the optical system according to the invention, in which the objective is adjusted to an infinite distance.

Referring to Fig. 1, reference numeral 1 designates the objective of a television recording camera; 2 and 3 designate the outer boundaries of the lenses contained in this objective. In the plane of the outlet pupil 4 of the objective lies the focus 5 of the first part 6 of the field lens system. Both the first part 6 and the second part 7 of the field lens system are positive. Reference numerals 8 and 9 designate the main surfaces of these two parts. The first part 6, the focal distance of which is consequently equal to the distance between its main surface 8 and the outlet pupil of the objective 1, is secured to this objective in a manner such that upon a displacement of this objective along the optical axis X—X of the optical system the first part 6 remains always at the same distance from the objective.

The second part 7 of the field lens system is arranged relatively to the relay lens system (not shown) in a manner such that the inlet pupil 10 of this relay lens system is always located at the area of the focus 11 of the second part 7.

When adjusting the objective 1 to different object distances, this objective being thus displaced along the optical axis X—X, the first part 6 moves with the objective 1. Thus the relative distance $a$ between the main surfaces 8 and 9 of the first and the second part 6 and 7 respectively varies. In the arrangement shown in Fig. 1 this distance $a$ has the minimum value, since the objective 1 is adjusted to an infinite distance. From Fig. 2 it is evident that, when this objective 1 is adjusted to the finite, the distance between the main surfaces 8 and 9 of the first part 6 and the second part 7 respectively has increased to a value $a_1$.

It will be obvious that with each adjustment of the objective 1, owing to this divided construction of the field lens system and to the invariable distance between the outlet pupil of the objective 1 and the main surface 8 of the first part 6, the outlet pupil of the objective 1 is always reproduced at the area of the inlet pupil of the relay lens system, which thus coincides with the focus 11 of the second part 7 of the field lens system. Between the first part and the second part of the field lens system a so-called telecentric beam is produced. Thus the whole quantity of light emanating from the object and captured by the objective finds its way to the relay lens system.

In the embodiment shown in Fig. 3 the first part 6 and the second part 7 of the field lens system are achromatic doublets. The radius of curvature, the thicknesses and the refraction indices of the components of these doublets may be used for the correction of any optical aberration.

In a further embodiment (not shown) only the first part 6 is an achromatic doublet and the second part 7 is constituted by a single feeble lens located in the object plane of the objective 1.

Referring to Fig. 4, reference numeral 13 designates one of the objectives located with a few other objectives (not shown) on an objective revolver, which is provided on the front side of a television camera. To each of these objectives is added in the manner shown in Figs. 1, 2 and 3 the first part of the field lens system, which is always spaced apart by the focal distance from the objective in the manner described above. Thus the first part 14a of the field lens system shown in Fig. 4 is spaced apart from the objective 13 by the focal distance. The relay lens system is denoted by the reference numeral 15. At 17 the intermediate image 16 at the area of the field lens system of an object (not shown) is reproduced by it on a smaller scale. The boundary surfaces of the objective 13 is illustrated as $N_1$, $N_2$ and the boundary surfaces of the relay lens system is $R_1$, $R_2$.

In accordance with the invention, in this embodiment the aperture ratios of all objectives of the objective revolver i.e. from the so-called tele-objective to the objective of the largest aperture ratio, are chosen to be such that they are at least equal to the product of the effective aperture of the camera and the magnification of the relay lens system. This product is materially lower than the effective aperture ratio of the whole optical system comprising the objective 13, the field lens system 14a and 14b and the relay lens system 15. This appears from a comparison of the angular aperture 18 of the objective on the image side (indicated in Fig. 4, which is equal to the angular aperture of the relay lens system on the object side) with the angular aperture 19 of the relay lens system on the image side.

By a suitable choice of the ratio between the angles 18 and 19 of the relay lens system a sufficient light intensity may be obtained for each objective and for any desirable object distance. It is thus possible to employ objectives having an aperture ratio of $f/4.5$ commercially obtainable with very short focal distances to focal distances exceeding for example 500 mms. Such objectives, if used with a relay lens system producing a diminution of for example 1 to 3, permit the construction of an optical system having the same light intensity as a completely open objective having an aperture ratio of $f/1.5$.

In the embodiment shown in Fig. 5 the field lens system the parts of which are designated by 21 and 22, corresponds with the field lens system shown in Fig. 3.

To each of the objectives 20 of the camera is added a first part 21 of the field lens system, which is spaced apart substantially by the focal distance from the outlet pupil of the associated objective 20. The second part 22 of the field lens system is spaced apart by a definite distance equal to its focal distance from the inlet pupil of the relay lens system comprising the parts 23 and 24. The boundary surfaces of the objective 20 and relay lens 23 and 24 are illustrated as $N_1$, $N_2$ and $R_1$, $R_2$ respectively.

The image surfaces 17a and 25a shown in Figs. 4 and 5 may be constituted by a light-sensitive layer on a film or by the photo-cathode of a television camera tube respectively.

What is claimed is:

1. A camera optical system comprising a lens objective, a field lens system, a relay lens system, and an image surface all arranged in sequence along the optical axis of said optical system, means for displacing said lens objective axially to predetermined distances from the object to be reproduced by said camera, said field lens system comprising two spaced parts each having a main surface, one of said parts being permanently positioned at the focal distance thereof measured from the outlet pupil of said objective to the main surface of said one part, the other of said parts being positioned at its focal distance extending from the inlet pupil of said relay lens system to the main surface of said other part, and means moving said one of said parts of the field lens system together with said lens objective along the optical axis of said system relative to said second part of said field lens system and the relay lens system.

2. A camera optical system as claimed in claim 1 wherein said relay lens system has a magnification of less than 1.

References Cited in the file of this patent

UNITED STATES PATENTS

| | | |
|---|---|---|
| 2,391,430 | Macek | Dec. 25, 1945 |
| 2,398,276 | Altman | Apr. 9, 1946 |
| 2,479,792 | Tackaberry | Aug. 23, 1949 |
| 2,541,014 | Orser | Feb. 13, 1951 |
| 2,552,238 | Turner et al. | May 8, 1951 |
| 2,586,436 | Planer | Feb. 19, 1952 |
| 2,719,457 | Tripp | Oct. 4, 1955 |
| 2,747,466 | Orser | May 29, 1956 |

FOREIGN PATENTS

| | | |
|---|---|---|
| 331,944 | Germany | Jan. 19, 1921 |